Sept. 20, 1932.   O. GERLINE   1,877,845
FISHING ROD HOLDER
Filed Oct. 3, 1931   2 Sheets-Sheet 1
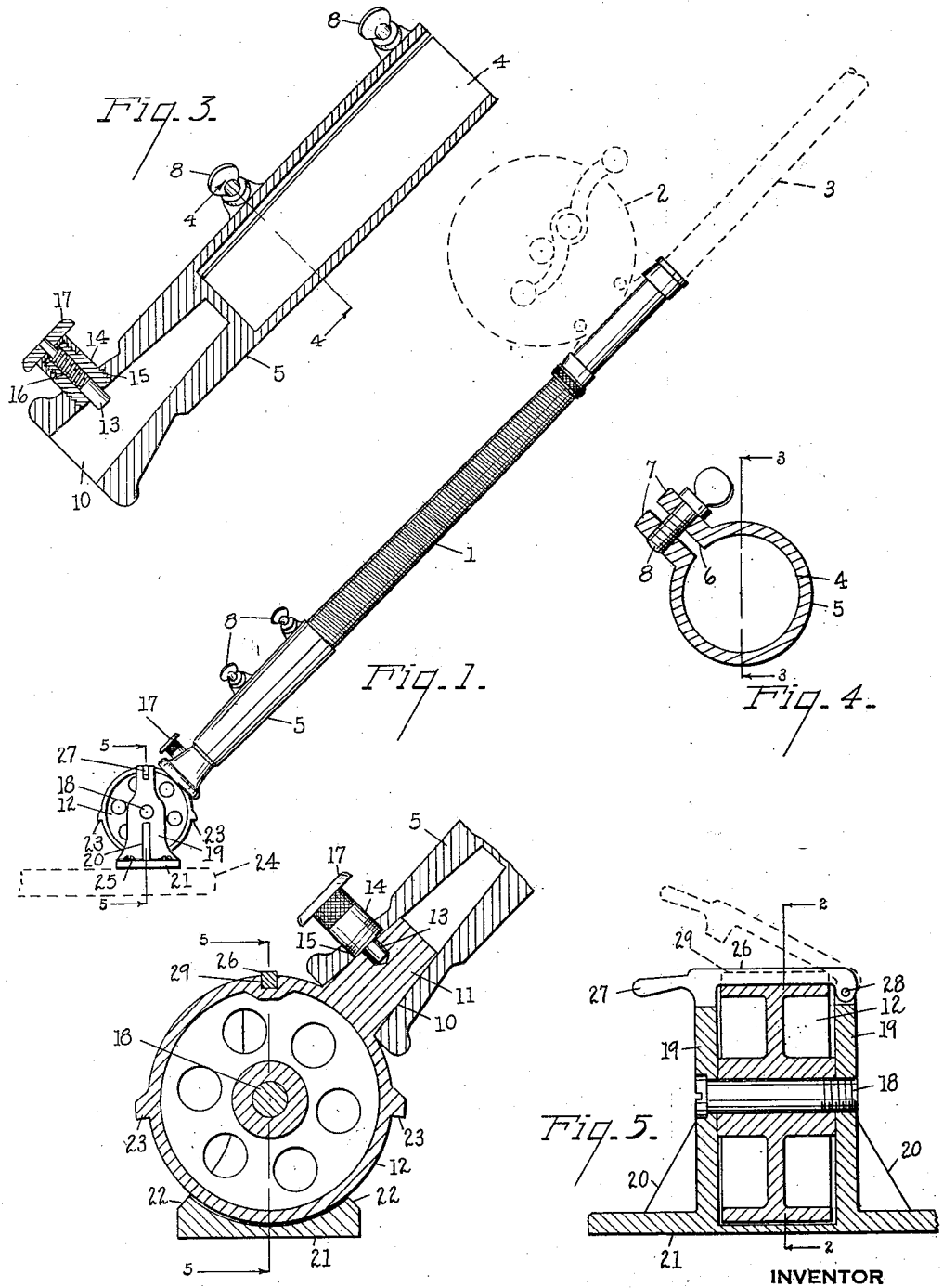
INVENTOR
Otto Gerline
BY
Chappell & Earl
ATTORNEYS Sept. 20, 1932.    O. GERLINE    1,877,845
FISHING ROD HOLDER
Filed Oct. 3, 1931    2 Sheets-Sheet 2
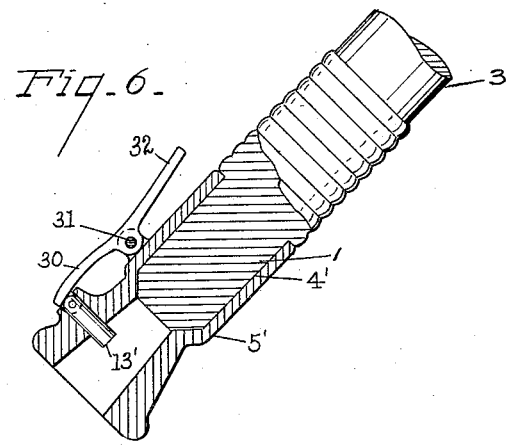
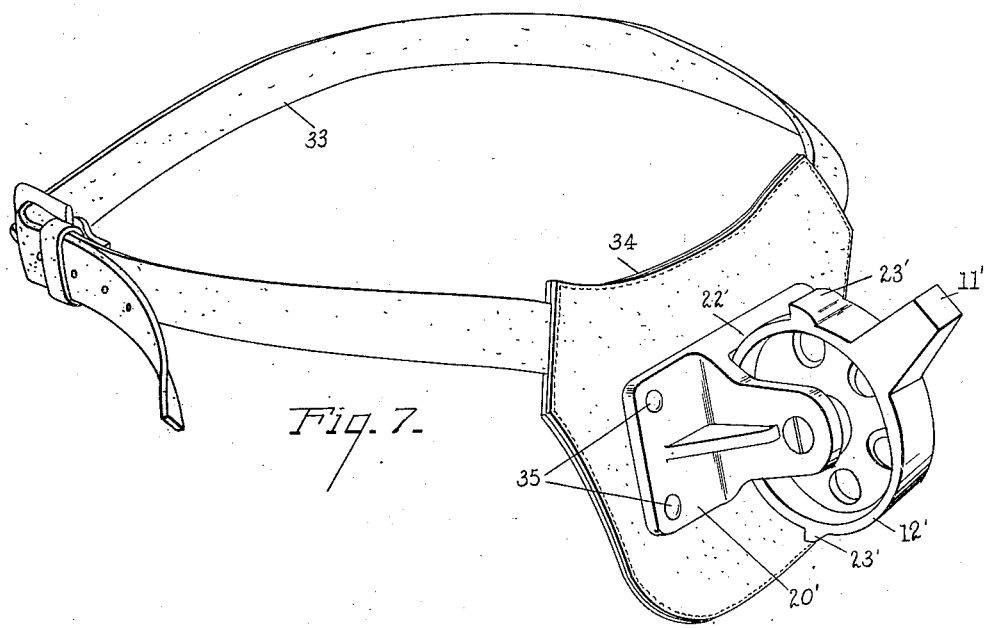
INVENTOR
Otto Gerline
BY
Chappell Earl
ATTORNEYS Patented Sept. 20, 1932

1,877,845

UNITED STATES PATENT OFFICE

OTTO GERLINE, OF KALAMAZOO, MICHIGAN

FISHING ROD HOLDER

Application filed October 3, 1931. Serial No. 566,617.

The main objects of the invention are:

First, to provide a fishing rod holder which is adapted to limit the movement of the fishing rod to a single vertical plane and through a limited arc.

Second, to provide a fishing rod holder having means associated therewith for preventing the turning of the rod, particularly while reeling in and working the fish, sometimes known or designated as "pumping".

Third, to provide a device of this character having means associated therewith for readily attaching to an anchoring member such as a chair or to the angler's belt.

Fourth, to provide a fishing rod holder of this type having means for locking the fishing rod in elevated position for trolling or the like.

Fifth, to provide a pivoted fishing rod holder having means associated therewith for quickly releasing the rod.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary view in side elevation of a fishing rod having a holder associated therewith embodying my invention.

Fig. 2 is an enlarged fragmentary section taken on line 2—2 of Fig. 5.

Fig. 3 is a longitudinal section taken on line 3—3 of Fig. 4 of the rod socket member.

Fig. 4 is a transverse section taken on line 4—4 of Fig. 3.

Fig. 5 is a vertical transverse section taken on line 5—5 of Fig. 2.

Fig. 6 is a fragmentary view partially in side elevation and partially in longitudinal section of a modified socket member.

Fig. 7 is a perspective view of a belt having a modified form of my device associated therewith.

Referring to the drawings, numeral 1 indicates the handle or butt of a fishing rod having a reel shown conventionally mounted thereon. The fishing rod 3 is illustrated by the dotted lines in Fig. 1. The handle or butt 1 of the fishing rod is disposed within the upper socket 4 of the rod holder 5 which is split at 6 and provided with clamping flanges 7 which are adapted to be moved relative to each other by thumb screws 8. The handle or butt 1 is clamped firmly within the socket 4.

The holder 5 is also provided with a noncircular lower socket 10 which is adapted to receive the similarly shaped non-circular stud or arm 11 projecting from the periphery of the wheel-like support 12. The non-circular shape of the socket 10 and the stud 11 prevents the fishing rod 3 from turning about its own axis particularly when the reel 2 is being operated or during "pumping" action or motion of the fishing rod.

The holder 5 and the arm 11 of the support are releasably connected together by the transverse pin 13. In the embodiment illustrated by Figs. 3 to 5, inclusive, a nipple 14 is threaded to an enlarged opening 15 for carrying the pin 13 and for housing the spring 16 which yieldingly urges the pin 13 into engagement with the opening provided therefor in the stud 11. The pin 13 is provided with an enlarged head 17 which constitutes a finger piece by means of which pin 13 may be pulled out against the force of the spring 16 to quickly release the holder 5 from the stud 11.

The support 12 is rotatably carried by journal 18 which is carried by and between sides 19 of the bracket 20. The base 21 of bracket 20 is provided with stops 22 which coact with the stops 23 provided on the periphery of the holder or support 12. The stops 22 and 23 limit the arc through which the fishing rod 3 can swing.

The bracket 20 may be mounted on any suitable or convenient anchoring member such as a chair or seat 24, as indicated by dotted lines in Fig. 1, by bolts 25. The anchoring member 24 may conveniently be the angler's chair or the angler's belt which will be described in more detail below in connection with Fig. 7.

A manually operable latch 26, having a handle or finger piece 27, is pivoted to one side 19 of the bracket 20 at 28 for coaction with the keeper slot 29 provided therefor in the periphery of the support 12. By registering the latch 26 with the slot 29, the support 12 may be locked against rotation with the fishing rod 3 in an angular position best suited for trolling or the like. If desired, the periphery of the support 12 may be provided with a plurality of keeper slots similar to slot 29, whereby to coact with the latch 26 to lock the support 12 in any desired one of a number of angular positions.

Referring to the modification illustrated in Fig. 6, the butt 1 of the fishing rod 3 is frictionally fitted within the upper socket 4' of the rod holder 5' and pin 13' is carried by one end of the manually operable lever 30 which is pivoted to the holder 5' at 31. In use, the fishing rod 3 may be quickly detached from the support stud by merely grasping and depressing the handle 32 of the lever 30. The lever 30 may be provided with resilient means (not shown) for maintaining the pin 13' in its desired position.

Referring to Fig. 7, the numeral 33 designates a belt which is provided with a pad-like belt slide 34. In this embodiment, the bracket 20' is connected to a belt slide 34 by rivets 35, and the support 12' is pivoted to the bracket 20', as described above in connection with Figs. 1 to 5 inclusive. In this embodiment also, the position locking means is omitted, the support 12' being free to turn between the limits of stops 22' and 23'.

As is well known, in deep sea fishing, a relatively heavy fishing rod and a large and heavy reel, as well as a very long and heavy line, are commonly used. These weights, when combined, reach a considerable amount and make it very tiresome for the angler to hold for a considerable time. With my device, as embodied in Figs. 1 to 5 inclusive, the hands of the angler are relieved from practically all of this weight, and in trolling, the device supports the rod in proper position leaving the hands of the angler free. When manipulating or reeling in a fish, the device prevents the annoying tendency of the rod to turn, which has been a source of trouble in deep sea angling. After the fish has been brought near the boat and it becomes necessary for the angler to hold the rod free of the anchoring member, a slight pressure on the releasing means quickly frees the handle of the fishing rod.

With the parts thus arranged, the bracket may be mounted on a seat or swiveled chair which is commonly used in deep sea fishing from a motor boat, and the rod anchored in position shown in Fig. 1 in which position the angler is relieved of the necessity of supporting the rod, at the same time the rod is in a convenient position for grasping in the event of a strike and the reel is within easy reach.

The rod is supported so that the strain and pressure of reeling does not turn or rotate the rod about its own axis. In the event of a strike, the angler can quickly release the catch and then manipulate his reel and oscillate or "pump" the rod, it being the usual practice to pull up on the rod, quickly releasing it, thereby producing slack in the line which is taken up as quickly as possible by means of the reel, this operation being repeated as conditions will permit. The rod can be quickly freed if desired.

I have illustrated and described my improvements in embodiments which I consider very desirable. I have not attempted to illustrate or describe certain other embodiments or adaptations which I contemplate as it is believed that this disclosure will enable those skilled in the art to embody and adapt my improvements as may be desired.

Having thus described my invention, what I claim as new and desire to secure by Letters Patent, is:

1. In a device of the class described, the combination of a supporting bracket provided with spaced stops, a wheel-like rod supporting member pivoted to said bracket and having spaced stops coacting with said stops on said bracket to limit the rotative movement of said support, said support having a non-circular radially projecting stud, a rod holder having a socket for a fishing rod and a non-circular socket coacting with said stud, a releasable means for securing said rod holder to said stud, and releasable means for locking said support relative to its bracket including a latch pivoted to said bracket and coacting with a slot-like keeper on said support.

2. In a device of the class described, the combination of a supporting bracket provided with spaced stops, a wheel-like rod supporting member pivoted to said bracket and having spaced stops coacting with said stops on said bracket to limit the rotative movement of said support, said support having a non-circular radially projecting stud, a rod holder having a socket for a fishing rod and a non-circular socket coacting with said stud, and releasable means for locking said support relative to its bracket including a latch pivoted to said bracket and coacting with a slot-like keeper on said support.

3. In a device of the class described, the combination of a supporting bracket provided with spaced stops, a wheel-like rod supporting member pivoted to said bracket and having spaced stops coacting with said stops on said bracket to limit the rotative movement of said support, said support having a non-circular radially projecting stud, a rod holder having a socket for a fishing rod and a non-circular socket coacting with said stud, and a releasable means for securing said rod holder to said stud.

4. In a device of the class described, the combination of a supporting bracket provided with spaced stops, a wheel-like rod supporting member pivoted to said bracket and having spaced stops coacting with said stops on said bracket to limit the rotative movement of said support, said support having a non-circular radially projecting stud, and a rod holder having a socket for a fishing rod and a non-circular socket coacting with said stud.

5. A device of the class described comprising a supporting bracket, a wheel-like support pivotally mounted thereon, said support being provided with a radial non-circular arm, a rod holder having a non-circular socket adapted to receive said arm, means for detachably securing said holder to said arm, and coacting means including a cross bar pivoted on said bracket and a cross slot in said support for holding said support in a predetermined position.

6. A device of the class described comprising a supporting bracket, a wheel-like support pivotally mounted thereon and provided with radial stops limiting its oscillating movement, said support being provided with a non-circular radial arm, and a rod holder having a non-circular socket adapted to received said arm.

In witness whereof I have hereunto set my hand.

OTTO GERLINE.